(12) United States Patent
Damazo et al.

(10) Patent No.: US 12,467,826 B2
(45) Date of Patent: Nov. 11, 2025

(54) SYSTEM AND METHOD FOR CALIBRATING THE LIGHT SENSITIVITY OF A CAMERA (71) Applicant: The Boeing Company, Arlington, VA (US)

(72) Inventors: Jason S. Damazo, Seattle, WA (US); Dejan Nikic, Seattle, WA (US); Dominic Martinez, Shoreline, WA (US); Shahriar Khosravani, Everett, WA (US); Philipp Andreas Boettcher, Golden, CO (US)

(73) Assignee: The Boeing Company, Arlington, VA (US)

( * ) Notice: Subject to any disclaimer, the term of this patent is extended or adjusted under 35 U.S.C. 154(b) by 267 days.

(21) Appl. No.: 18/302,893

(22) Filed: Apr. 19, 2023

(65) Prior Publication Data

US 2024/0353290 A1    Oct. 24, 2024

(51) Int. Cl.
*G01M 11/00* (2006.01)
*G01M 11/02* (2006.01)

(52) U.S. Cl.
CPC ...... *G01M 11/332* (2013.01); *G01M 11/0214* (2013.01)

(58) Field of Classification Search
CPC ........... G01M 11/332; G01M 11/0214; G01M 11/02; G01M 11/00; G01N 21/93; G01N 21/8835; G01N 21/8806; G01J 1/08; G01J 5/80; G01J 5/02

See application file for complete search history.

(56) References Cited

U.S. PATENT DOCUMENTS

| | | | | |
|---|---|---|---|---|
| 6,075,592 A | * | 6/2000 | Banerjee | G01R 31/2656 356/318 |
| 2013/0087719 A1 | * | 4/2013 | Yang | G02B 21/16 250/459.1 |

* cited by examiner

*Primary Examiner* — Tarifur R Chowdhury
(74) *Attorney, Agent, or Firm* — Alleman Hall & Tuttle LLP (57) ABSTRACT

A system for calibrating the light sensitivity of a camera includes a light emitter for emitting a light pulse, a fiber splitter for receiving the light pulse via an input port and providing first and second portions of the light pulse to respective first and second output ports, and a light collector for receiving the first portion from the first output port and converting the first portion to a first signal representative of a light characteristic of the first portion. A first fiber optic cable connects the light emitter and the input port, a second fiber optic cable connects the first output port and the light collector, and a third fiber optic cable has a first cable end connected with the second output port and a second cable end for emitting the second portion of the light pulse for capture by the camera. A related method is also provided.

20 Claims, 6 Drawing Sheets

SYSTEM AND METHOD FOR CALIBRATING THE LIGHT SENSITIVITY OF A CAMERA

This disclosure relates to systems and methods for calibrating the light sensitivity of cameras used in aerospace lightning testing.

In the aerospace industry, it is customary to conduct lightning testing of aircraft and aircraft components to determine their robustness against lightning strikes. Typically such testing is conducted by placing a simulated lightning source close to and on one side of an aircraft component (such as a wing section containing an empty fuel tank), and causing a simulated lightning strike from the lightning source to strike the aircraft component. Meanwhile, a camera is situated on the other side of the aircraft component to detect whether any light is emitted from the aircraft component due to the simulated strike penetrating or causing an electrical discharge on the camera-facing side of the aircraft component. In this type of testing arrangement, the light sensitivity of the camera must be calibrated so that the light intensity, light duration or other characteristics of the electrical discharge that is captured by the camera may be relied upon.

In the abovementioned approach, the simulated lightning source typically includes a high-voltage charging source, special capacitors, high-voltage resistors, and tungsten electrodes machined to a precise geometry, which together form a capacitive system capable of a sudden capacitive discharge in order to create an electric arc which simulates a lightning strike. However, this system is not commercially available, requires specific manufacturing expertise, and is considerably expensive. Moreover, the electric arc produced by this system is difficult to keep consistent, and the users of this system must be highly trained in order to safely work with the high voltages involved.

SUMMARY

According to one embodiment, a system for calibrating a light sensitivity of a camera includes a light emitter configured to emit a light pulse therefrom, a fiber splitter, a light collector, and first, second and third fiber optic cables. The fiber splitter has an input port, a first output port and a second output port, wherein the fiber splitter is configured to receive the light pulse via the input port and to provide a first portion of the light pulse to the first output port and a second portion of the light pulse to the second output port according to a splitting ratio, wherein the first portion is greater than or equal to the second portion. The light collector is configured to receive the first portion from the first output port and convert the first portion to a first signal that is representative of a light characteristic of the first portion. The first fiber optic cable operatively connects the light emitter and the input port, and the second fiber optic cable operatively connects the first output port and the light collector. The third fiber optic cable has opposed first and second cable ends, wherein the first cable end is operatively connected with the second output port and the second cable end is configured for emitting the second portion of the light pulse therefrom across a predetermined distance for capture by the camera.

The system may also include a fixture apparatus, which includes a cable fixture for mounting the second cable end at a first location and a camera fixture for mounting the camera at a second location, such that when the second cable end is mounted in the cable fixture and the camera is mounted in the camera fixture (thereby defining a line-of-sight between the second cable end and the camera), the second cable end is pointed generally along the line-of-sight and is disposed at the predetermined distance from the camera. Additionally, a light isolation chamber may extend along and at least partially enclose the line-of-sight.

The system may further include a controller operatively connected to the light emitter for controlling a pulse timing of the light emitter and to the light collector for receiving the first signal from the light collector. The pulse timing may include a starting time for causing the light emitter to begin emitting the light pulse therefrom and a stopping time for causing the light emitter to begin ceasing the emission of the light pulse therefrom. The controller may also be configured to control a shutter timing of a shutter of the camera, such that the shutter is caused to open before the light emitter is caused to emit the light pulse and the shutter is caused to close after the light pulse reaches a peak intensity plus a predetermined fall time. The controller may be further configured to: (i) receive a second signal from the camera which is representative of the light characteristic of the second portion; (ii) cause the light emitter to emit multiple instances of the light pulse; (iii) receive a first set of multiple instances of the first signal and a second set of multiple instances of the second signal; (iv) create a first data set based on the first set and a second data set based on the second set; (v) determine a first average for the first data set and a second average for the second data set; and (vi) compare the first and second averages with each other using a comparison algorithm to estimate the light sensitivity of the camera. The comparison algorithm may account for the splitting ratio and any difference between respective ranges of the first and second data sets.

The light collector may include an integrating sphere configured to receive the first portion and a photodetector operatively connected with the integrating sphere and configured to convert the first portion to the first signal. The light characteristic may include an intensity, a duration, a total energy or a cumulative integrated intensity. The fiber splitter may be configured to provide 99% of the light pulse to the first output port and 1% of the light pulse to the second output port.

According to another embodiment, a calibration system for calibrating a light sensitivity of a camera used in aerospace lightning testing includes a light emitter configured to emit a light pulse therefrom, a fiber splitter, a light collector, first, second and third fiber optic cables, a fixture apparatus, a light isolation chamber and a controller. The fiber splitter has an input port, a first output port and a second output port, wherein the fiber splitter is configured to receive the light pulse via the input port and to provide a first portion of the light pulse to the first output port and a second portion of the light pulse to the second output port according to a splitting ratio, wherein the first portion is greater than or equal to the second portion. The light collector is configured to receive the first portion from the first output port and convert the first portion to a first signal that is representative of a light characteristic of the first portion. The first fiber optic cable operatively connects the light emitter and the input port, and the second fiber optic cable operatively connects the first output port and the light collector. The third fiber optic cable has opposed first and second cable ends, wherein the first cable end is operatively connected with the second output port and the second cable end is configured for emitting the second portion of the light pulse therefrom across a predetermined distance for capture by the camera. The fixture apparatus includes a cable fixture for mounting the second cable end at a first location and a camera fixture for mounting the camera at a second location, such that when the second cable end is mounted in the cable fixture and the camera is mounted in the camera fixture (thereby defining a line-of-sight between the second cable end and the camera), the second cable end is pointed generally toward the camera and is disposed at the predetermined distance from the camera. The light isolation chamber extends along and at least partially encloses the line-of-sight, and the controller is operatively connected to the light emitter for controlling a pulse timing of the light emitter and to the light collector for receiving the first signal from the light collector.

In this calibration system, the pulse timing may include a starting time for causing the light emitter to begin emitting the light pulse therefrom and a stopping time for causing the light emitter to begin ceasing the emission of the light pulse therefrom, and the controller may be further configured to control a shutter timing of a shutter of the camera, such that the shutter is caused to open before the light emitter is caused to emit the light pulse and the shutter is caused to close after the light pulse reaches a peak intensity plus a predetermined fall time.

The controller may be further configured to: (i) receive a second signal from the camera which is representative of the light characteristic of the second portion; (ii) cause the light emitter to emit multiple instances of the light pulse; (iii) receive a first set of multiple instances of the first signal and a second set of multiple instances of the second signal; (iv) create a first data set based on the first set and a second data set based on the second set; (v) determine a first average for the first data set and a second average for the second data set; and (vi) compare the first and second averages with each other using a comparison algorithm to estimate the light sensitivity of the camera. In this arrangement, the comparison algorithm may account for the splitting ratio and any difference between respective ranges of the first and second data sets.

Also in this calibration system, the light collector may include an integrating sphere configured to receive the first portion and a photodetector operatively connected with the integrating sphere and configured to convert the first portion to the first signal, and the light characteristic may include an intensity, a duration, a total energy or a cumulative integrated intensity.

According to yet another embodiment, a method for calibrating a light sensitivity of a camera includes (i) positioning the camera at a predetermined distance from and pointing generally toward a light emission point of a calibration system, wherein the calibration system includes: (a) a light emitter configured to emit a light pulse therefrom; (b) a fiber splitter having an input port, a first output port and a second output port, wherein the fiber splitter is configured to receive the light pulse via the input port and to provide a first portion of the light pulse to the first output port and a second portion of the light pulse to the second output port according to a splitting ratio, wherein the first portion is greater than or equal to the second portion; (c) a light collector configured to receive the first portion from the first output port and convert the first portion to a first signal that is representative of a light characteristic of the first portion; (d) a first fiber optic cable operatively connecting the light emitter and the input port; (e) a second fiber optic cable operatively connecting the first output port and the light collector; and (f) a third fiber optic cable having opposed first and second cable ends, wherein the first cable end is operatively connected with the second output port and the second cable end is the light emission point and is configured for emitting the second portion of the light pulse therefrom. The method further includes: (ii) opening a shutter of the camera; (iii) causing the light emitter to emit the light pulse; (iv) receiving the first portion by the light collector and the second portion by the camera; (v) closing the shutter after the light pulse reaches a peak intensity plus a predetermined fall time; (vi) converting the first portion to the first signal by the light collector and converting the second portion to a second signal by the camera which is representative of the light characteristic of the second portion; (vii) repeating the opening, causing, receiving, closing and converting steps to produce multiple instances of the light pulse, a first set of multiple instances of the first signal and a second set of multiple instances of the second signal; (viii) creating a first data set based on the first set and a second data set based on the second set; (ix) determining a first average for the first data set and a second average for the second data set; and (x) comparing the first and second averages with each other using a comparison algorithm to estimate the light sensitivity of the camera.

In this method, the comparison algorithm may account for the splitting ratio and any difference between respective ranges of the first and second data sets, and the light characteristic may include an intensity, a duration, a total energy or a cumulative integrated intensity.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, a system 20 and a method 100 for calibrating the light sensitivity 18 of a camera 16 are shown and described herein. Such a system 20 and method 100 may be used in aerospace lightning testing, as well as in a variety of other applications.

In contrast with the abovementioned customary approach, the system 20 and method 100 presented herein solve the technical problem of providing a way of calibrating the light sensitivity 18 of cameras 16 used in lightning testing or other applications, by the technical effect of utilizing light pulses from a safe, low-voltage light source in a controlled manner, thereby providing significant benefits and technical advantages which are not taught or suggested by other known approaches. These benefits and technical advantages include the use of commonly available components and avoiding the use of high voltages, which offers less complexity, less cost, higher reliability and improved safety as compared to previous approaches.

Figure 1:
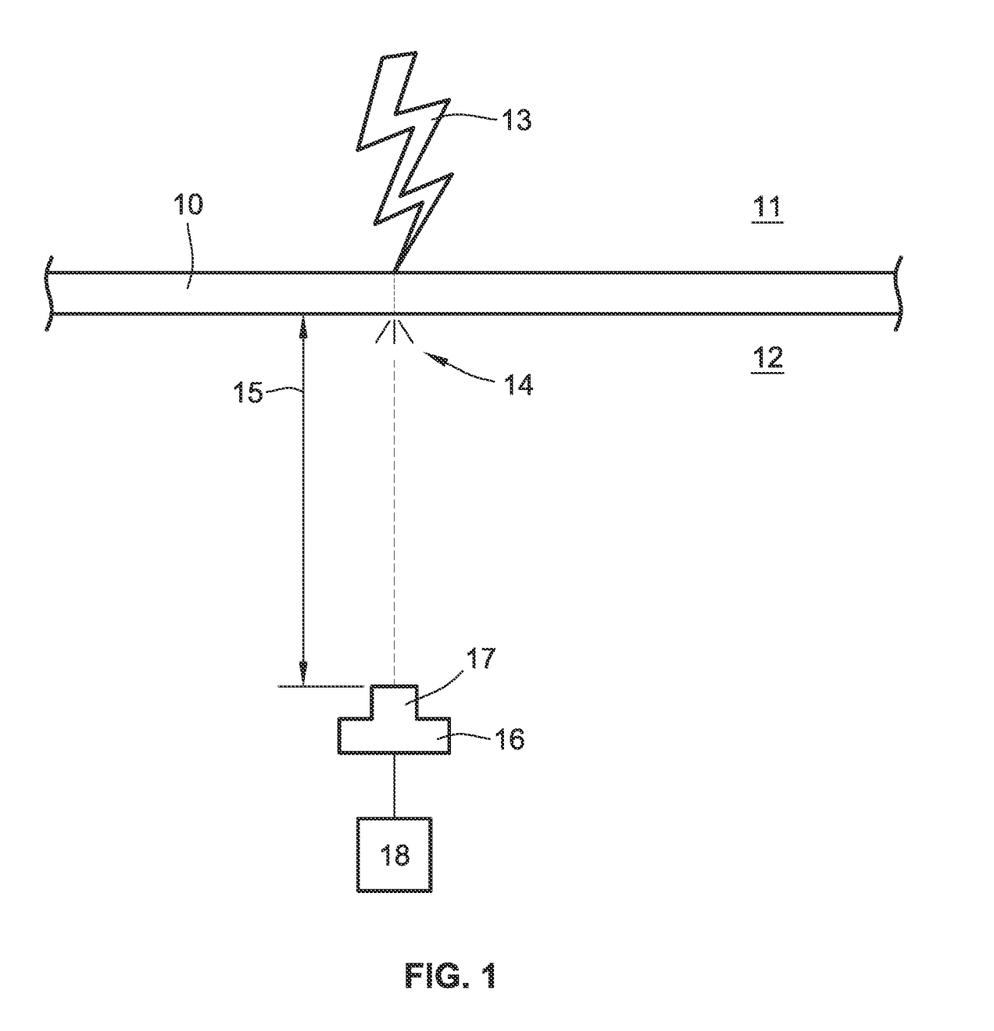
FIG. 1 is a schematic view of a test rig for aerospace lightning testing utilizing a camera according to a conventional approach.
Figure 2:
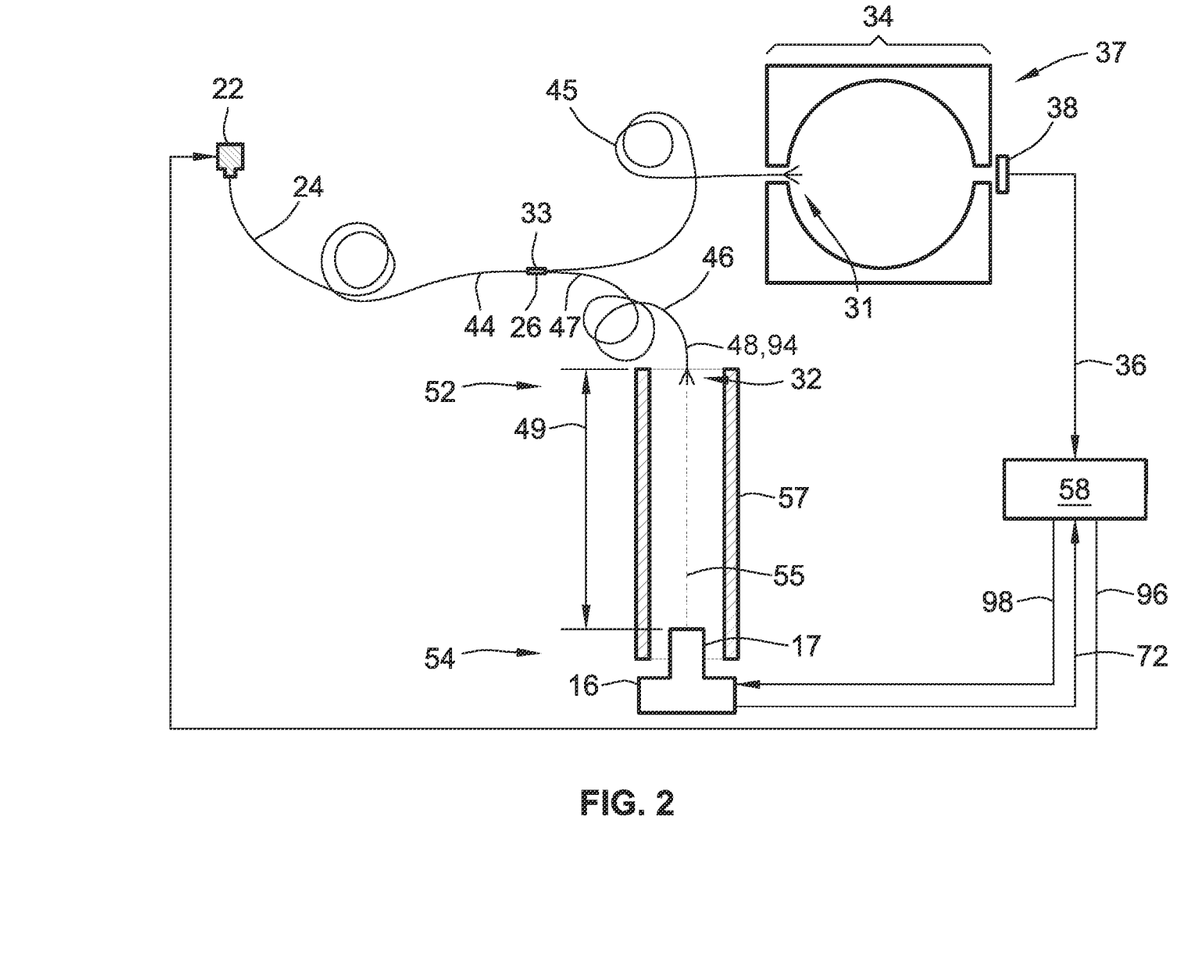
FIG. 2 is a schematic view of a system for calibrating the light sensitivity of a camera according to the present disclosure.

FIG. 1 shows a schematic view of a test rig for aerospace lightning testing utilizing a camera 16 according to a conventional approach, and FIG. 2 shows a schematic view of a system 20 for calibrating the light sensitivity 18 of a camera 16 according to the present disclosure. In FIG. 1, a portion of a wing or fuel tank wall 10 is shown which defines an outer environment 11 on one side of the wall 10 and an inner environment 12 on the other side of the wall 10. For example, the inner environment 12 may represent the interior of a fuel tank within an aircraft wing, and the outer environment 11 may represent the exterior atmosphere outside the aircraft in which lightning strikes 13 may occur. In conventional aerospace lightning testing, a simulated lightning strike or electric arc 13 may be produced by abruptly discharging a supercapacitor, with the thickness and material of the wall 10 and the intensity of the arc/strike 13 controlled so as to simulate an actual lightning strike of an aircraft. The arc/strike 13 may produce a small discharge or light pulse 14 on the interior or inner environment 12 side of the wall 10, and a camera 16 may be situated a predetermined distance 15 (e.g., 1.5 meters) away from the wall 10 and pointed at the site of the small discharge/light pulse 14. The camera 16 has a shutter 17 which may be controlled to open and close so as to capture the discharge/light pulse 14. The captured light may be used as part of the lightning test itself, and/or it may be used to calibrate the light sensitivity 18 of the camera 16.

FIG. 2 shows the system 20 for calibrating the light sensitivity 18 of a camera 16 according to the present disclosure. The system 20 includes a light emitter 22 configured to emit a light pulse 24, a fiber splitter 26, a light collector 34, and first, second and third fiber optic cables 44, 45, 46. The light emitter 22 may be a light emitting diode (LED), and the light pulse 24 may comprise white light. For example, the light emitter 22 may comprise a red LED configured to emit red light, a blue LED configured to emit blue light, and a green LED configured to emit green light, such that a combination of the emitted red, blue and green light produces a white light.

Figure 3:
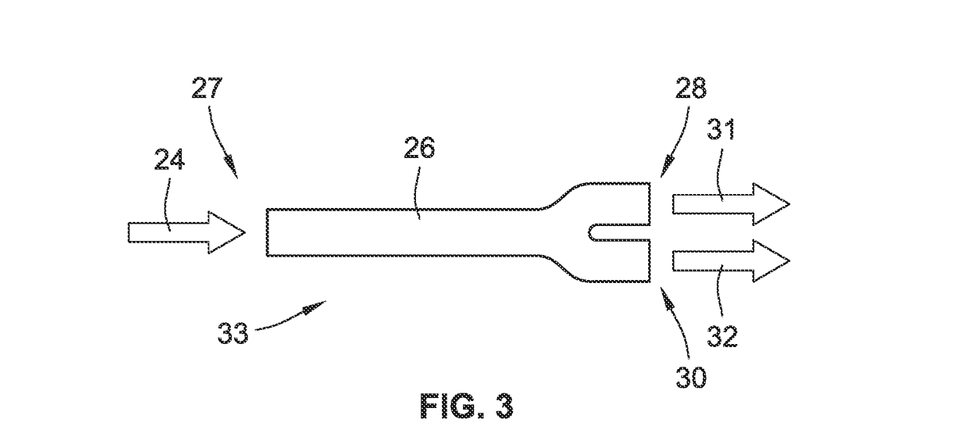
FIG. 3 is a schematic diagram of a fiber splitter.

The fiber splitter 26, which is illustrated in more detail in the schematic drawing of FIG. 3, has an input port 27, a first output port 28 and a second output port 30. The fiber splitter 26 is configured to receive the light pulse 24 via the input port 27 and to provide a first portion 31 of the light pulse 24 to the first output port 28 and a second portion 32 of the light pulse 24 to the second output port 30 according to a splitting ratio 33, where the first portion 31 is greater than or equal to the second portion 32. For example, the fiber splitter 26 may be configured to provide a splitting ratio 33 of 99:1, where a first portion 31 representing 99% of the light pulse 24 is provided to the first output port 28, and a second portion 32 representing 1% of the light pulse 24 is provided to the second output port 30. As other examples, splitting ratios 33 of 90:10, 80:20, 75:25, 67:33 or 50:50 may be used, including any other splitting ratio 33 where the first portion 31 is greater than or equal to the second portion 32.

The light collector 34 is configured to receive the first portion 31 of the light pulse 24 from the first output port 28 of the splitter 26, and to convert the first portion 31 to a first signal 36 that is representative of a light characteristic 40 of the first portion 31. The light collector 34 may take the form of an integrating sphere 37 configured to receive the first portion 31 and a photodetector 38 operatively coupled with the integrating sphere 37 and configured to convert the first portion 31 to the first signal 36. The first signal 36 may include a single signal or a series of multiple sequential signals, with each of these single or multiple signals representing either (i) an instantaneous measurement or detection at a respective point in time or (ii) an accumulated or integrated measurement or detection across a short span of time. The light characteristic 40 of the first portion 31 (which the first signal 36 represents) may include an intensity 41 of the first portion 31, a duration 42 of the first portion 31, a total energy 43 of the first portion 31, or a cumulative integrated intensity 99 of the first portion 31.

The first fiber optic cable 44 operatively connects the light emitter 22 and the input port 27 of the splitter 26, and the second fiber optic cable 45 operatively connects the first output port 28 of the splitter 26 and an input side of the light collector 34. The third fiber optic cable 46 has opposed first and second cable ends 47, 48, with the first cable end 47 being operatively connected with the second output port 30 of the splitter 26, and the second cable end 48 (also referred to herein as a light emission point 94) being configured for emitting the second portion 32 of the light pulse 24 therefrom. Thus, the light pulse 24 from the light emitter 22 may travel through the first fiber optic cable 44 to the splitter 26, where the light pulse 24 is then divided into two portions 31, 32, with the first portion 31 traveling through the second fiber optic cable 45 to the light collector 34 and the second portion 31 traveling through the third fiber optic cable 46 to the second cable end/light emission point 48, 94. The second portion 32 of the light pulse 24 may then be emitted by the second cable end/light emission point 48, 94 across a predetermined distance 49 (e.g., 1.5 meters) for being received or captured by the camera 16.

Figure 4:
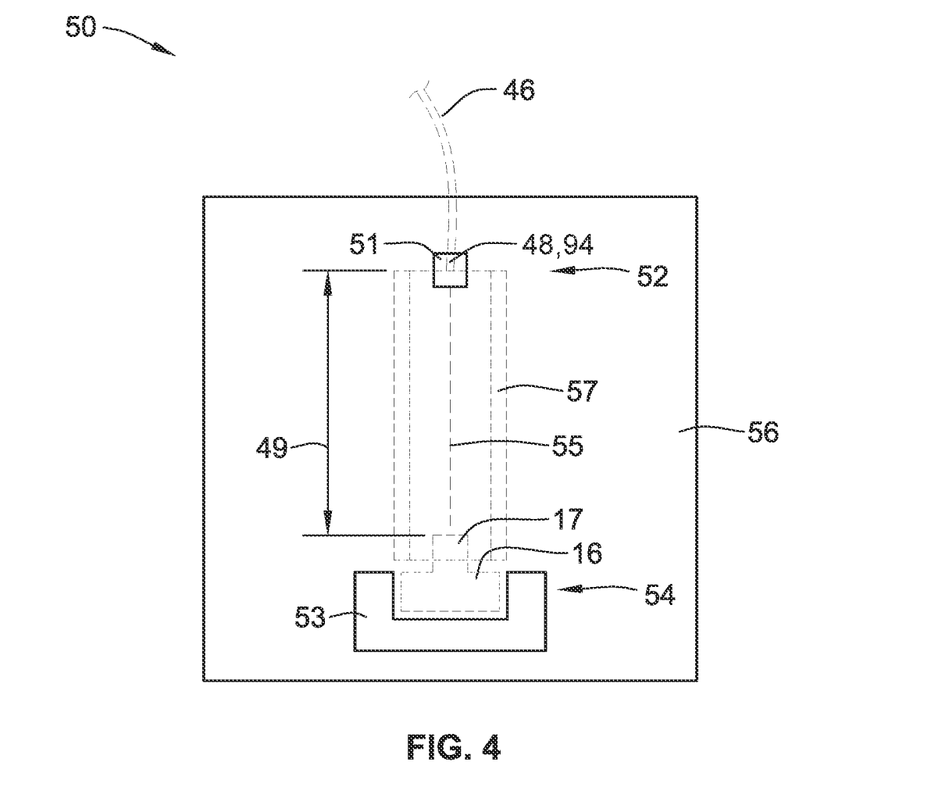
FIG. 4 is a schematic diagram of a fixture apparatus for use with the calibration system.

FIG. 4 shows a schematic diagram of a fixture apparatus 50 which may be used with the calibration system 20. The fixture apparatus 50 includes a cable fixture 51 for mounting the second cable end 48 at a first location 52 and a camera fixture 53 for mounting the camera 16 at a second location 54, such that when the second cable end 48 is mounted in the cable fixture 51 and the camera 16 is mounted in the camera fixture 53 (thereby defining a line-of-sight 55 between the second cable end 48 and the camera 16), the second cable end 48 is pointed generally along the line-of-sight 55 and is disposed at the predetermined distance 49 from the camera 16. The cable fixture 51 and the camera fixture 53 may be mounted on a platen 56 or other platform, so as to provide the desired predetermined distance 49 between the second cable end 48 and the camera 16.

Additionally, a light isolation chamber 57 (shown in FIGS. 2 and 4) may extend along and at least partially enclose the line-of-sight 55 between the second cable end 48 and the camera 16. For example, the light isolation chamber 57 may take the form of an open-ended or closed-ended tube surrounding and enshrouding the line-of-sight 55, and the inner walls of the chamber 57 may optionally be one or more of black, matte and light-absorptive, or they may optionally be one or more of white, shiny, glossy and light-reflective. The light isolation chamber 55 may be used to prevent extraneous light (i.e., from any source other than the second portion 32 of the light pulse 24) from being detected by the camera 16, and/or for causing as much as possible of the light emitted from second cable end 48 to be detectable by the camera 16.

Figure 5:
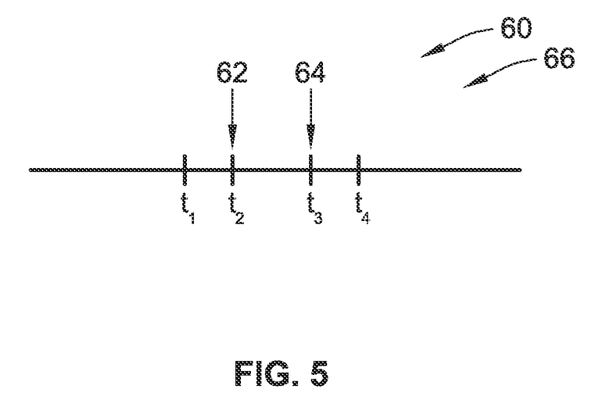
FIG. 5 is a timeline showing the pulse timing and shutter timing for the calibration system.

The system 20 may further include a controller 58 operatively connected to the light emitter 22 for controlling a pulse timing 60 of the light emitter 22 and to the light collector 34 for receiving the first signal 36 from the light collector 34. As illustrated by the timeline of FIG. 5, the pulse timing 60 may include a starting time 62 at time $t_2$ for causing the light emitter 22 to begin emitting the light pulse 24 therefrom and a stopping time 64 shortly thereafter at time $t_3$ for causing the light emitter 22 to begin ceasing the emission of the light pulse 24 therefrom. The controller 58 may also be configured to control a shutter timing 66 of the camera's shutter 17 (see FIG. 5), such that the shutter 17 is caused to open at time $t_1$ before the light emitter 22 is caused to begin emitting the light pulse 24 at $t_2$, and the shutter 17 is caused to close at time $t_4$ after the light pulse 24 reaches a peak intensity 68 plus a predetermined fall time 70, which is after time $t_3$. Thus, the sequence illustrated in FIG. 5 involves: (i) opening the shutter 17 at $t_1$, (ii) causing the light emitter 22 to begin emitting a light pulse 24 at $t_2$, (iii) causing the light emitter 22 to begin ceasing the emission of the light pulse 24 at $t_3$, and (iv) closing the shutter 17 at $t_4$.

Figure 6:
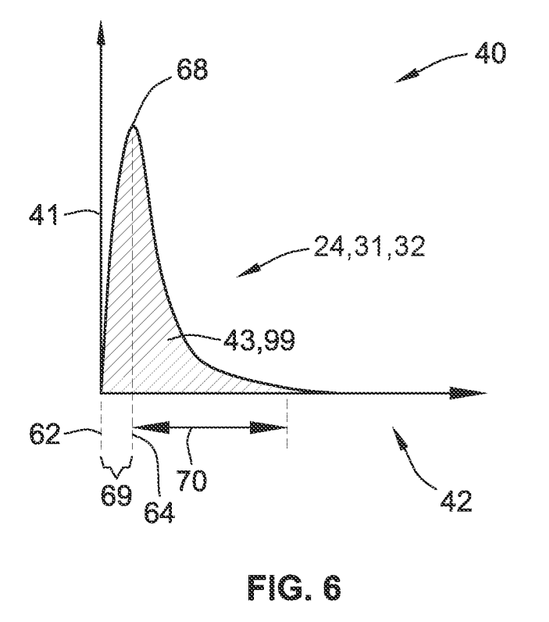
FIG. 6 is an intensity versus time curve for a light characteristic of a light pulse.

FIG. 6 shows an intensity 41 versus time 42 curve for a light characteristic 40 of a light pulse, such as the light pulse 24 emitted by the emitter 22, the first portion 31 detected by the light collector 34 (represented by the first signal 36), or the second portion 32 detected by the camera 16 (represented by a second signal 72, introduced below). More specifically, the vertical axis measures intensity 41, the horizontal axis measures time or duration 42, and the area under the curve represents a total energy 43 and/or a cumulative integrated intensity 99. Note that the starting time 62 corresponds to the time $t_2$ shown in FIG. 5, and the stopping time 64 corresponds to the time $t_3$. At the starting time 62, the light emitter 22 is energized, and the intensity 41 rises during a predetermined rise time 69 as the emitter 22 begins generating and transmitting a light pulse 24, which is propagated through the first fiber optic cable 44 and the splitter 26, and then through the second and third fiber optic cables 45, 46 as the first and second portions 31, 32. The pulse 24 continues to rise until a peak intensity 68 is reached at the stopping time 64, whereupon the light emitter 22 is de-energized and begins ceasing the emission of the light pulse 24. However, notice that the intensity 41 does not instantaneously drop to zero at the stopping/de-energizing time 64, but decays to zero over a predetermined fall time 70.

Returning to FIG. 2, it can be seen that the controller 58 may be configured for sending a pulse timing control signal 96 to the light emitter 22 for turning the emitter 22 "on" at a starting time 62, $t_2$ and "off" at a stopping time 64, $t_3$, and for sending a shutter timing control signal 98 to the camera 16 for opening the shutter 17 before the starting time 62, $t_2$ at time $t_1$ and closing the shutter 17 after the stopping time 64, $t_3$ at time $t_4$. The controller 58 may also be configured to receive a second signal 72 from the camera 16 which is representative of the light characteristic 40 of the second portion 32.

Figure 7A:
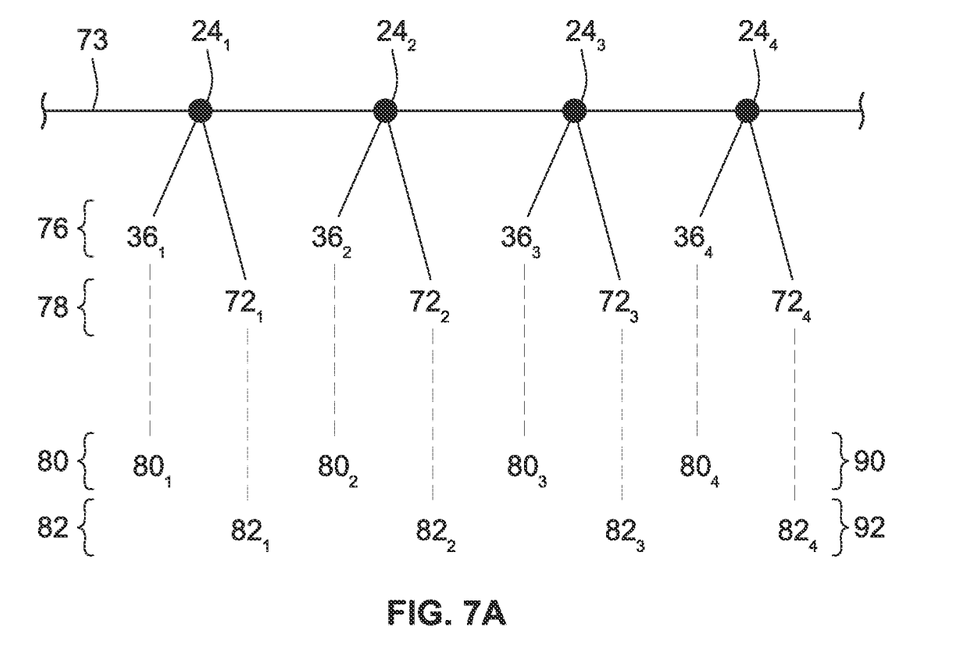
FIG. 7A is a representation of multiple instances of light pulses and their resulting first and second signals.
Figure 7B:
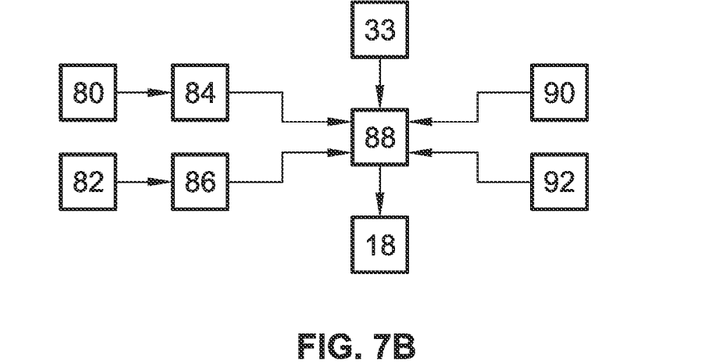
FIG. 7B is a representation of data sets and averages based on the signals shown in FIG. 7A.

FIG. 7A shows a timeline 73 illustrating multiple instances 74 of light pulses 24 being generated by the light emitter 22, and of the first and second signals 36, 72 generated by the light collector 34 and camera 16, respectively, from these multiple pulses. Relatedly, FIG. 7B shows a representation of respective data sets 80, 82 and averages 84, 86 that are based on the first and second signals 36, 72 shown in FIG. 7A. For, example, four individual light pulse instances 74 are shown, designated as $24_1$, $24_2$, $24_3$ and $24_4$. For each instance 74, a respective first signal 36 is generated by the light collector 34 and a respective second signal 72 is generated by the camera 16. Thus, the first light pulse $24_1$ generates signals $36_1$ and $72_1$, the second light pulse $24_2$ generates signals $36_2$ and $72_2$, the third light pulse $24_3$ generates signals $36_3$ and $72_3$, and the fourth light pulse $24_4$ generates signals $36_4$ and $72_4$. The collection of first signals $36_1$, $36_2$, $36_3$, $36_4$ may be viewed as a first set 76 of multiple instances of the first signal 36, and the collection of second signals $72_1$, $72_2$, $72_3$, $72_4$ may be viewed as a second set 78 of multiple instances of the second signal 72.

Since the first and second signals 36, 72 are reflective of corresponding data, then the first set 76 of individual first signals $36_1$, $36_2$, $36_3$, $36_4$ may be viewed as corresponding to a first data set 80 of individual first data $80_1$, $80_2$, $80_3$, $80_4$, and the second set 78 of individual second signals $72_1$, $72_2$, $72_3$, $72_4$ may be viewed as corresponding to a second data set 82 of individual second data $82_1$, $82_2$, $82_3$, $82_4$. In turn, the first data set 80 may have a first average 84 (of the individual first data $80_1$, $80_2$, $80_3$, $80_4$) and a first range 90 (from the lowest to the highest among the individual first data $80_1$, $80_2$, $80_3$, $80_4$); similarly, the second data set 82 may have a second average 86 (of the individual second data $82_1$, $82_2$, $82_3$, $82_4$) and a second range 92 (from the lowest to the highest among the individual second data $82_1$, $82_2$, $82_3$, $82_4$).

The controller 58 may be further configured to cause the light emitter 22 to emit multiple instances 74 of the light pulse 24, and to receive a first set 76 of multiple instances of the first signal 36 and a second set 78 of multiple instances of the second signal 72. Additionally, the controller 58 may create a first data set 80 based on the first set 76 and a second data set 82 based on the second set 78, then determine a first average 84 for the first data set 80 and a second average 86 for the second data set 82, and then compare the first and second averages 84, 86 with each other using a comparison algorithm 88 to estimate the light sensitivity 18 of the camera 16. As illustrated by the block diagram of FIG. 7B, the comparison algorithm 88 may also include or account for the splitting ratio 33 and any difference between respective ranges 90, 92 of the first and second data sets 80, 82 in order to estimate the camera's light sensitivity 18. Thus, in one aspect, the controller 58 and/or the comparison algorithm 88 compares the light pulses detected by the light collector 34 to the light pulses detected by the camera 16 in order to calibrate the light sensitivity 18 of the camera 16.

Figure 8:
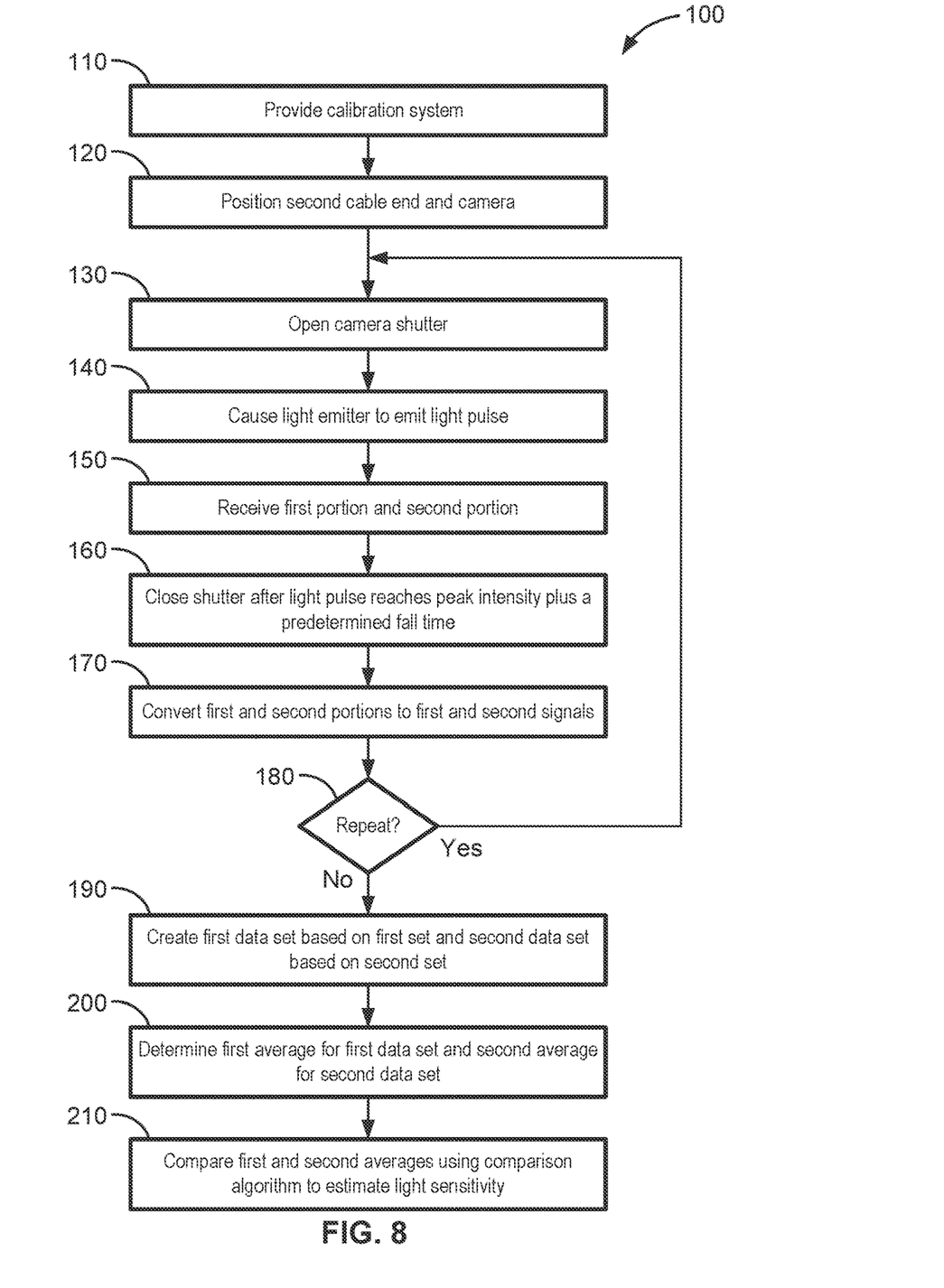
FIG. 8 is a flowchart for a method for calibrating the light sensitivity of a camera according to the present disclosure.

FIG. 8 shows a flowchart for a method 100 for calibrating the light sensitivity 18 of a camera 16 according to the present disclosure. At block 110, an optional step may be performed of providing a suitable calibration system 20 for use in the method 100. At block 120, the camera 16 is positioned at a predetermined distance 15 from a light emission point 94 of the calibration system 20, with the camera 16 also being positioned so as to point or be aimed generally toward the light emission point 94. Here, the calibration system 20 includes: (a) a light emitter 22 configured to emit a light pulse 24 therefrom; (b) a fiber splitter 26 having an input port 27, a first output port 28 and a second output port 30, wherein the fiber splitter 26 is configured to receive the light pulse 24 via the input port 27 and to provide a first portion 31 of the light pulse 24 to the first output port 28 and a second portion 32 of the light pulse 24 to the second output port 30 according to a splitting ratio 33, wherein the first portion 31 is greater than or equal to the second portion 32; (c) a light collector 34 configured to receive the first portion 31 from the first output port 28 and convert the first portion 31 to a first signal 36 that is representative of a light characteristic 40 of the first portion 31; (d) a first fiber optic cable 44 operatively connecting the light emitter 22 and the input port 27; (e) a second fiber optic cable 45 operatively connecting the first output port 28 and the light collector 34; and (f) a third fiber optic cable 46 having opposed first and second cable ends 47, 48, wherein the first cable end 47 is operatively connected with the second output port 30 and the second cable end 48 is the light emission point 94 and is configured for emitting the second portion 32 of the light pulse 24 therefrom.

The method 100 further includes: at block 130, opening a shutter 17 of the camera 16; at block 140, causing the light emitter 22 to emit the light pulse 24; at block 150, receiving the first portion 31 by the light collector 34 and the second portion 32 by the camera 16; at block 160, closing the shutter 17 after the light pulse 24 reaches a peak intensity 68 plus a predetermined fall time 70; at block 170, converting the first portion 31 to the first signal 36 by the light collector 34 and converting the second portion 32 to a second signal 72 by the camera 16 which is representative of the light characteristic 40 of the second portion 32; at block 180, repeating the opening, causing, receiving, closing and converting steps (at blocks 130, 140, 150, 160 and 170) to produce multiple instances 74 of the light pulse 24, a first set 76 of multiple instances of the first signal 36 and a second set 78 of multiple instances of the second signal 72; at block 190, creating a first data set 80 based on the first set 76 and a second data set 82 based on the second set 78; at block 200, determining a first average 84 for the first data set 80 and a second average 86 for the second data set 82; and at block 210, comparing the first and second averages 84, 86 with each other using a comparison algorithm 88 to estimate the light sensitivity 18 of the camera 16.

In this method 100, and as illustrated in FIG. 7B, the comparison algorithm 88 may account for the splitting ratio 33 and any difference between respective ranges 90, 92 of the first and second data sets 80, 82. Additionally in this method 100, and as illustrated in FIG. 6, the light characteristic 40 may include an intensity 41, a duration 42, a total energy 43 or a cumulative integrated intensity 99.

Thus, it may be seen that the foregoing system 20 and method 100 is configured using commonly available components (such as LED/other light sources, fiber optic cables, fiber optic splitters, integrating spheres, etc.), thereby providing a calibration system 20 which is easier and less expensive to manufacture, and a method 100 which is easier, less expensive and safer to operate, as compared to the aforementioned conventional systems. Additionally, the system 20 and method 100 provides the functionality of receiving the first portion 31 of light by the light collector 34 and the second portion 32 of light by the camera 16, and then comparing these two received portions 31, 32 with each other in conjunction with the known splitting ratio 33, in order to calibrate the light sensitivity 18 of the camera 16.

The system 20 and method 100 may be presented or arranged in a variety of different configurations and embodiments.

According to one embodiment, a system 20 for calibrating a light sensitivity 18 of a camera 16 includes a light emitter 22 configured to emit a light pulse 24 therefrom, a fiber splitter 26, a light collector 34, and first, second and third fiber optic cables 44, 45, 46. The fiber splitter 26 has an input port 27, a first output port 28 and a second output port 30, wherein the fiber splitter 26 is configured to receive the light pulse 24 via the input port 27 and to provide a first portion 31 of the light pulse 24 to the first output port 28 and a second portion 32 of the light pulse 24 to the second output port 30 according to a splitting ratio 33, wherein the first portion 31 is greater than or equal to the second portion 32. The light collector 34 is configured to receive the first portion 31 from the first output port 28 and convert the first portion 31 to a first signal 36 that is representative of a light characteristic 40 of the first portion 31. The first fiber optic cable 44 operatively connects the light emitter 22 and the input port 27, and the second fiber optic cable 45 operatively connects the first output port 28 and the light collector 34. The third fiber optic cable 46 has opposed first and second cable ends 47, 48, wherein the first cable end 47 is operatively connected with the second output port 30 and the second cable end 48 is configured for emitting the second portion 32 of the light pulse 24 therefrom across a predetermined distance 49 for capture by the camera 16.

The system 20 may also include a fixture apparatus 50, which includes a cable fixture 51 for mounting the second cable end 48 at a first location 52 and a camera fixture 53 for mounting the camera 16 at a second location 54, such that when the second cable end 48 is mounted in the cable fixture 51 and the camera 16 is mounted in the camera fixture 53 (thereby defining a line-of-sight 55 between the second cable end 48 and the camera 16), the second cable end 48 is pointed generally along the line-of-sight 55 and is disposed at the predetermined distance 49 from the camera 16. Additionally, a light isolation chamber 57 may extend along and at least partially enclose the line-of-sight 55.

The system 20 may further include a controller 58 operatively connected to the light emitter 22 for controlling a pulse timing 60 of the light emitter 22 and to the light collector 34 for receiving the first signal 36 from the light collector 34. The pulse timing 60 may include a starting time 62 for causing the light emitter 22 to begin emitting the light pulse 24 therefrom and a stopping time 64 for causing the light emitter 22 to begin ceasing the emission of the light pulse 24 therefrom. The controller 58 may also be configured to control a shutter timing 66 of a shutter 17 of the camera 16, such that the shutter 17 is caused to open before the light emitter 22 is caused to emit the light pulse 24 and the shutter 17 is caused to close after the light pulse 24 reaches a peak intensity 68 plus a predetermined fall time 70. The controller 58 may be further configured to: (i) receive a second signal 72 from the camera 16 which is representative of the light characteristic 40 of the second portion 32; (ii) cause the light emitter 22 to emit multiple instances 74 of the light pulse 24; (iii) receive a first set 76 of multiple instances of the first signal 36 and a second set 78 of multiple instances of the second signal 72; (iv) create a first data set 80 based on the first set 76 and a second data set 82 based on the second set 78; (v) determine a first average 84 for the first data set 80 and a second average 86 for the second data set 82; and (vi) compare the first and second averages 84, 86 with each other using a comparison algorithm 88 to estimate the light sensitivity 18 of the camera 16. The comparison algorithm 88 may account for the splitting ratio 33 and any difference between respective ranges 90, 92 of the first and second data sets 80, 82.

The light collector 34 may include an integrating sphere 37 configured to receive the first portion 31 and a photodetector 38 operatively connected with the integrating sphere 37 and configured to convert the first portion 31 to the first signal 36. The light characteristic 40 may include an intensity 41, a duration 42, a total energy 43 or a cumulative integrated intensity 99. The fiber splitter 26 may be configured to provide 99% of the light pulse 24 to the first output port 28 and 1% of the light pulse 24 to the second output port 30.

According to another embodiment, a calibration system 20 for calibrating a light sensitivity 18 of a camera 16 used in aerospace lightning testing includes a light emitter 22 configured to emit a light pulse 24 therefrom, a fiber splitter 26, a light collector 34, first, second and third fiber optic cables 44, 45, 46, a fixture apparatus 50, a light isolation chamber 57 and a controller 58. The fiber splitter 26 has an input port 27, a first output port 28 and a second output port 30, wherein the fiber splitter 26 is configured to receive the light pulse 24 via the input port 27 and to provide a first portion 31 of the light pulse 24 to the first output port 28 and a second portion 32 of the light pulse 24 to the second output port 30 according to a splitting ratio 33, wherein the first portion 31 is greater than or equal to the second portion 32. The light collector 34 is configured to receive the first portion 31 from the first output port 28 and convert the first portion 31 to a first signal 36 that is representative of a light characteristic 40 of the first portion 31. The first fiber optic cable 44 operatively connects the light emitter 22 and the input port 27, and the second fiber optic cable 45 operatively connects the first output port 28 and the light collector 34. The third fiber optic cable 46 has opposed first and second cable ends 47, 48, wherein the first cable end 47 is operatively connected with the second output port 30 and the second cable end 48 is configured for emitting the second portion 32 of the light pulse 24 therefrom across a predetermined distance 49 for capture by the camera 16. The fixture apparatus 50 includes a cable fixture 51 for mounting the second cable end 48 at a first location 52 and a camera fixture 53 for mounting the camera 16 at a second location 54, such that when the second cable end 48 is mounted in the cable fixture 51 and the camera 16 is mounted in the camera fixture 53 (thereby defining a line-of-sight 55 between the second cable end 48 and the camera 16), the second cable end 48 is pointed generally toward the camera 16 and is disposed at the predetermined distance 49 from the camera 16. The light isolation chamber 57 extends along and at least partially encloses the line-of-sight 55, and the controller 58 is operatively connected to the light emitter 22 for controlling a pulse timing 60 of the light emitter 22 and to the light collector 34 for receiving the first signal 36 from the light collector 34.

In this calibration system 20, the pulse timing 60 may include a starting time 62 for causing the light emitter 22 to begin emitting the light pulse 24 therefrom and a stopping time 64 for causing the light emitter 22 to begin ceasing the emission of the light pulse 24 therefrom, and the controller 58 may be further configured to control a shutter timing 66 of a shutter 17 of the camera 16, such that the shutter 17 is caused to open before the light emitter 22 is caused to emit the light pulse 24 and the shutter 17 is caused to close after the light pulse 24 reaches a peak intensity 68 plus a predetermined fall time 70.

The controller 58 may be further configured to: (i) receive a second signal 72 from the camera 16 which is representative of the light characteristic 40 of the second portion 32; (ii) cause the light emitter 22 to emit multiple instances 74 of the light pulse 24; (iii) receive a first set 76 of multiple instances of the first signal 36 and a second set 78 of multiple instances of the second signal 72; (iv) create a first data set 80 based on the first set 76 and a second data set 82 based on the second set 78; (v) determine a first average 84 for the first data set 80 and a second average 86 for the second data set 82; and (vi) compare the first and second averages 84, 86 with each other using a comparison algorithm 88 to estimate the light sensitivity 18 of the camera 16. In this arrangement, the comparison algorithm 88 may account for the splitting ratio 33 and any difference between respective ranges 90, 92 of the first and second data sets 80, 82.

Also in this calibration system 20, the light collector 34 may include an integrating sphere 37 configured to receive the first portion 31 and a photodetector 38 operatively connected with the integrating sphere 37 and configured to convert the first portion 31 to the first signal 36, and the light characteristic 40 may include an intensity 41, a duration 42, a total energy 43 or a cumulative integrated intensity 99.

According to yet another embodiment, a method 100 for calibrating a light sensitivity 18 of a camera 16 includes (i) at block 120, positioning the camera 16 at a predetermined distance 15 from and pointing generally toward a light emission point 94 of a calibration system 20, wherein the calibration system 20 includes: (a) a light emitter 22 configured to emit a light pulse 24 therefrom; (b) a fiber splitter 26 having an input port 27, a first output port 28 and a second output port 30, wherein the fiber splitter 26 is configured to receive the light pulse 24 via the input port 27 and to provide a first portion 31 of the light pulse 24 to the first output port 28 and a second portion 32 of the light pulse 24 to the second output port 30 according to a splitting ratio 33, wherein the first portion 31 is greater than or equal to the second portion 32; (c) a light collector 34 configured to receive the first portion 31 from the first output port 28 and convert the first portion 31 to a first signal 36 that is representative of a light characteristic 40 of the first portion 31; (d) a first fiber optic cable 44 operatively connecting the light emitter 22 and the input port 27; (c) a second fiber optic cable 45 operatively connecting the first output port 28 and the light collector 34; and (f) a third fiber optic cable 46 having opposed first and second cable ends 47, 48, wherein the first cable end 47 is operatively connected with the second output port 30 and the second cable end 48 is the light emission point 94 and is configured for emitting the second portion 32 of the light pulse 24 therefrom. The method 100 further includes: (ii) at block 130, opening a shutter 17 of the camera 16; (iii) at block 140, causing the light emitter 22 to emit the light pulse 24; (iv) at block 150, receiving the first portion 31 by the light collector 34 and the second portion 32 by the camera 16; (v) at block 160, closing the shutter 17 after the light pulse 24 reaches a peak intensity 68 plus a predetermined fall time 70; (vi) at block 170, converting the first portion 31 to the first signal 36 by the light collector 34 and converting the second portion 32 to a second signal 72 by the camera 16 which is representative of the light characteristic 40 of the second portion 32; (vii) at block 180, repeating the opening, causing, receiving, closing and converting steps (at blocks 130, 140, 150, 160 and 170) to produce multiple instances 74 of the light pulse 24, a first set 76 of multiple instances of the first signal 36 and a second set 78 of multiple instances of the second signal 72; (viii) at block 190, creating a first data set 80 based on the first set 76 and a second data set 82 based on the second set 78; (ix) at block 200, determining a first average 84 for the first data set 80 and a second average 86 for the second data set 82; and (x) at block 210, comparing the first and second averages 84, 86 with each other using a comparison algorithm 88 to estimate the light sensitivity 18 of the camera 16.

In this method 100, the comparison algorithm 88 may account for the splitting ratio 33 and any difference between respective ranges 90, 92 of the first and second data sets 80, 82, and the light characteristic 40 may include an intensity 42, a duration 42, a total energy 43 or a cumulative integrated intensity 99.

While various steps of the method 100 have been described as being separate blocks, and various functions of the system 20 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements.

(As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A system for calibrating a light sensitivity of a camera, comprising:
   a light emitter configured to emit a light pulse therefrom;
   a fiber splitter having an input port, a first output port and a second output port, wherein the fiber splitter is configured to receive the light pulse via the input port and to provide a first portion of the light pulse to the first output port and a second portion of the light pulse to the second output port according to a splitting ratio, wherein the first portion is greater than or equal to the second portion;
   a light collector comprising an integrating sphere configured to receive the first portion from the first output port and a photodetector operatively connected with the integrating sphere and configured to convert the first portion to a first signal that is representative of a light characteristic of the first portion;
   a first fiber optic cable operatively connecting the light emitter and the input port;
   a second fiber optic cable operatively connecting the first output port and the light collector; and
   a third fiber optic cable having opposed first and second cable ends, wherein the first cable end is operatively connected with the second output port and the second cable end is configured for emitting the second portion of the light pulse therefrom across a predetermined distance for capture by the camera.

2. The system of claim 1, further comprising:
   a fixture apparatus including a cable fixture for mounting the second cable end at a first location and a camera fixture for mounting the camera at a second location, such that when the second cable end is mounted in the cable fixture and the camera is mounted in the camera fixture, thereby defining a line-of-sight between the second cable end and the camera, the second cable end is pointed generally along the line-of-sight and is disposed at the predetermined distance from the camera.

3. The system of claim 2, further comprising:
   a light isolation chamber extending along and at least partially enclosing the line-of-sight.

4. The system of claim 1, further comprising:
   a controller operatively connected to the light emitter for controlling a pulse timing of the light emitter and to the light collector for receiving the first signal from the light collector.

5. The system of claim 4, wherein the pulse timing includes a starting time for causing the light emitter to begin emitting the light pulse therefrom and a stopping time for causing the light emitter to begin ceasing the emission of the light pulse therefrom.

6. The system of claim 4, wherein the controller is further configured to control a shutter timing of a shutter of the camera, such that the shutter is caused to open before the light emitter is caused to emit the light pulse and the shutter is caused to close after the light pulse reaches a peak intensity plus a predetermined fall time.

7. The system of claim 4, wherein the controller is further configured to:
   receive a second signal from the camera which is representative of the light characteristic of the second portion;
   cause the light emitter to emit multiple instances of the light pulse;
   receive a first set of multiple instances of the first signal and a second set of multiple instances of the second signal;
   create a first data set based on the first set and a second data set based on the second set;
   determine a first average for the first data set and a second average for the second data set; and compare the first and second averages with each other using a comparison algorithm to estimate the light sensitivity of the camera.

8. The system of claim 7, wherein the comparison algorithm accounts for the splitting ratio and any difference between respective ranges of the first and second data sets.

9. The system of claim 1, wherein the light characteristic includes an intensity, a duration, a total energy or a cumulative integrated intensity.

10. The system of claim 1, wherein the fiber splitter is configured to provide 99% of the light pulse to the first output port and 1% of the light pulse to the second output port.

11. A calibration system for calibrating a light sensitivity of a camera used in aerospace lightning testing, comprising:
  a light emitter configured to emit a light pulse therefrom;
  a fiber splitter having an input port, a first output port and a second output port, wherein the fiber splitter is configured to receive the light pulse via the input port and to provide a first portion of the light pulse to the first output port and a second portion of the light pulse to the second output port according to a splitting ratio, wherein the first portion is greater than or equal to the second portion;
  a light collector configured to receive the first portion from the first output port and convert the first portion to a first signal that is representative of a light characteristic of the first portion;
  a first fiber optic cable operatively connecting the light emitter and the input port;
  a second fiber optic cable operatively connecting the first output port and the light collector;
  a third fiber optic cable having opposed first and second cable ends, wherein the first cable end is operatively connected with the second output port and the second cable end is configured for emitting the second portion of the light pulse therefrom across a predetermined distance for capture by the camera;
  a fixture apparatus including a cable fixture for mounting the second cable end at a first location and a camera fixture for mounting the camera at a second location, such that when the second cable end is mounted in the cable fixture and the camera is mounted in the camera fixture, thereby defining a line-of-sight between the second cable end and the camera, the second cable end is pointed generally toward the camera and is disposed at the predetermined distance from the camera;
  a light isolation chamber extending along and at least partially enclosing the line-of-sight; and
  a controller operatively connected to the light emitter for controlling a pulse timing of the light emitter and to the light collector for receiving the first signal from the light collector.

12. The calibration system of claim 11, wherein the pulse timing includes a starting time for causing the light emitter to begin emitting the light pulse therefrom and a stopping time for causing the light emitter to begin ceasing the emission of the light pulse therefrom, and wherein the controller is further configured to control a shutter timing of a shutter of the camera, such that the shutter is caused to open before the light emitter is caused to emit the light pulse and the shutter is caused to close after the light pulse reaches a peak intensity plus a predetermined fall time.

13. The calibration system of claim 11, wherein the controller is further configured to:
  receive a second signal from the camera which is representative of the light characteristic of the second portion;
  cause the light emitter to emit multiple instances of the light pulse;
  receive a first set of multiple instances of the first signal and a second set of multiple instances of the second signal;
  create a first data set based on the first set and a second data set based on the second set;
  determine a first average for the first data set and a second average for the second data set; and
  compare the first and second averages with each other using a comparison algorithm to estimate the light sensitivity of the camera.

14. The calibration system of claim 13, wherein the comparison algorithm accounts for the splitting ratio and any difference between respective ranges of the first and second data sets.

15. The calibration system of claim 11, wherein the light collector comprises an integrating sphere configured to receive the first portion and a photodetector operatively connected with the integrating sphere and configured to convert the first portion to the first signal.

16. The calibration system of claim 11, wherein the light characteristic includes an intensity, a duration, a total energy or a cumulative integrated intensity.

17. The calibration system of claim 11, wherein the fiber splitter is configured to provide 99% of the light pulse to the first output port and 1% of the light pulse to the second output port.

18. A method for calibrating a light sensitivity of a camera, comprising:
  positioning the camera at a predetermined distance from and pointing generally toward a light emission point of a calibration system, wherein the calibration system includes:
    a light emitter configured to emit a light pulse therefrom;
    a fiber splitter having an input port, a first output port and a second output port, wherein the fiber splitter is configured to receive the light pulse via the input port and to provide a first portion of the light pulse to the first output port and a second portion of the light pulse to the second output port according to a splitting ratio, wherein the first portion is greater than or equal to the second portion;
    a light collector configured to receive the first portion from the first output port and convert the first portion to a first signal that is representative of a light characteristic of the first portion;
    a first fiber optic cable operatively connecting the light emitter and the input port;
    a second fiber optic cable operatively connecting the first output port and the light collector; and
    a third fiber optic cable having opposed first and second cable ends, wherein the first cable end is operatively connected with the second output port and the second cable end is the light emission point and is configured for emitting the second portion of the light pulse therefrom;
  opening a shutter of the camera;
  causing the light emitter to emit the light pulse;
  receiving the first portion by the light collector and the second portion by the camera;
  closing the shutter after the light pulse reaches a peak intensity plus a predetermined fall time;

converting the first portion to the first signal by the light collector and converting the second portion to a second signal by the camera which is representative of the light characteristic of the second portion;

repeating the opening, causing, receiving, closing and converting steps to produce multiple instances of the light pulse, a first set of multiple instances of the first signal and a second set of multiple instances of the second signal;

creating a first data set based on the first set and a second data set based on the second set;

determining a first average for the first data set and a second average for the second data set; and comparing the first and second averages with each other using a comparison algorithm to estimate the light sensitivity of the camera.

19. The method of claim 18, wherein the comparison algorithm accounts for the splitting ratio and any difference between respective ranges of the first and second data sets.

20. The method of claim 18, wherein the light characteristic includes an intensity, a duration, a total energy or a cumulative integrated intensity.

* * * * *